United States Patent [19]

Plumadore

[11] 3,972,613

[45] Aug. 3, 1976

[54] COPYBOARD

[75] Inventor: John D. Plumadore, Westfield, Mass.

[73] Assignee: Scott Paper Company, Philadelphia, Pa.

[22] Filed: Apr. 23, 1975

[21] Appl. No.: 570,879

[52] U.S. Cl. .................................. 355/75; 355/3 R

[51] Int. Cl.[2] .......................................... G03B 27/62

[58] Field of Search ............... 355/3 R, 3 CH, 8, 75, 355/76, 17, 113, 119, 120, 121; 96/1 R, 1 C

[56] References Cited

UNITED STATES PATENTS

| | | | |
|---|---|---|---|
| 3,140,945 | 7/1964 | Metcalfe et al. | 96/1 R |
| 3,671,121 | 6/1972 | Albert | 355/7 |
| 3,784,301 | 1/1974 | Sato | 355/3 R X |
| 3,799,666 | 3/1974 | Fukushima et al | 96/1 R X |
| 3,883,349 | 5/1975 | Sato | 355/1 R |

*Primary Examiner*—L. T. Hix
*Assistant Examiner*—E. M. O'Connor
*Attorney, Agent, or Firm*—R. Duke Vickrey; William J. Foley

[57] ABSTRACT

Disclosed is an improved copyboard for an electrophotographic recording apparatus which records information from a document onto a film. The apparatus consists of a transparent copyboard upon which the document is placed, light means for illuminating the document placed on the copyboard, mirror means for directing the reflected light image from the document to the film, and lens means for focusing the light image on the film. The improvement to the copyboard consists of a white border extending around the perimeter of the copyboard on the light means side of the copyboard and a dark border extending around the inside perimeter of the white border and on the document side of the copyboard. The copyboard eliminates the undesirable edge toning on an electrophotographic member by photographically reproducing in the border regions of the member a very dark border strip surrounded by a very light border strip.

1 Claim, 4 Drawing Figures

COPYBOARD

BACKGROUND OF THE INVENTION

1. Field of the Invention

The present invention relates generally to systems for electrophotographically reproducing data on photosensitive film, and more particularly, to an improved copyboard upon which documents are placed for copying the information in the document.

2. Description of the Prior Art

Stimulated by the cost incurred in storing the ever increasing volume of documentary material which is presently being generated, considerable effort has been expended in the design and development of various electrophotographic and other data storage and retrieval systems. Particular emphasis has been placed on the design of microphotographic systems which may be used to decrease the physical bulk of such storage materials without sacrificing file retrieval and/or copy reproduction capabilities. One type of apparatus for recording data on film for data storage is the indirect type of reproduction apparatus wherein a document is placed face down on a transparent copyboard and a light image is reflected from the document and directed by mirrors through a lens system and onto the film. This type of apparatus is disclosed in U.S. Pat. application Ser. No. 349,452, entitled Electrophotographic Method and Apparatus and filed Apr. 9, 1973 in the name of Frank C. Gross.

Electrophotographic film suitable for use in the apparatus described in U.S. Pat. application Ser. No. 349,452 are well known and typically consist of a support layer having coated thereon a layer containing a suitable photoconductor. The support layer is made conductive by either the inclusion therein of electrically-conductive materials or by coating the support layer surface designed to receive the photoconductive layer with an electrically-conductive material. Images are formed on the photoconductive layer within the above-described reproduction apparatus by first applying uniform electrostatic charge to the photoconductive layer and thereafter imaging the charged photoconductive layer by exposing it to light reflected from the document being reproduced, thereby causing the photoconductive layer to become conductive, which results in the dissipation of the charge in those areas of the layer exposed to light. In a subsequent step, the charge pattern or latent image on the photoconductive layer is rendered visible by the application thereto of colored or black electroscopic toner particles.

A major difficulty in prior art system is that, to produce a visible image of sufficient intensity, undesirable light and dark areas are sometimes present due to distortion of the electric lines of force on the charged surface of the photoconductive layer. Prior efforts to reduce this effect have been through the use of a development electrode spaced from the surface of the film being developed and connected to a source of electric potential to provide a bias that affects the field about the charged photoconductive layer and causes the charged developer particles to migrate to the highest or lowest charged regions (depending upon polarity). Other efforts have employed the development electrode in an electrically floating mode.

Charging is conventionally accomplished by exposing the surface of the photoconductive layer to a corona discharge, the polarity of which is chosen to produce the desired results upon the particular photoconductive layer being charged. Superior image reproductions are obtainable only when very uniform electrostatic charges are established on the photoconductive layer before imaging. In some electrophotographic imaging apparatus either the corona generating element or the electrophotographic recording element is moved during charging, which to some extent improves uniformity of charge over the surface of the photoconductive layer. In other electrophotographic apparatus (the apparatus of U.S. Ser. No. 349,452 being an example), charging takes place with no relative movement between the corona generating element and the electrophotographic recording medium. In such cases, the recording element may be a multi-frame microfiche and charging is commonly restricted to a small layer on the electrophotographic member by some form of shielding or masking means. This form of charging is accomplished without relative movement between the member and the charging means, and it results in a generally uniform potential of several hundred volts across most of the surface being charged and a potential of zero volts at the borders of the area being charged. Unfortunately, the portion of the surface having uniform charge does not extend up to the borders. Rather, the amount of charge tapers down to zero volts over some finite distance as the borders are approached. After imaging and developing the charged area, this border area has undesirable edge toning because of the charge gradient occuring there. Where the imaging step dissipates the entire charge in the border region, edge toning is not such a problem, but in conventional apparatus the charge in the border region is seldom entirely dissipated.

The prior art has dealt with this and related problems in several ways. For example, U.S. Pat. No. 3,556,655 to Lux et al. discloses discharge of the border regions with special exposure lamps to prevent any toning of those areas. U.S. Pat. No. 3,512,965 to Matkan discloses elimination of toning in the non-imaged areas, which includes both the border areas and the areas between the image lines, by subjecting the exposed electrophotographic member to a coating of a barrier chemical to reduce the tendency of the toner particles to adhere to the areas which are are not highly charged. U.S. Pat. No. 3,671,121 to Albert is concerned with the undesirable black border created by making positive copies from negatives, and discloses elimination of the black border by imaging through an opaque border mask. U.S. Pat. No. 3,687,538 to Matsumoto discloses elimination of undesirable black border by use of a discharging light source at the borders. All of these prior art devices require complex apparatus, which obviously is undesirable if simpler alternatives can be found. Therefore, it is the object of the invention to eliminate undesirable edge toning on an electrophotographic member through use of a simple, but effective, apparatus.

SUMMARY OF THE INVENTION

The invention eliminates the undesirable edge toning on an electrophotographic member by photographically reproducing in the border regions a very dark border strip surrounded by a very light border strip. The light border strip reproduces lighter than the background of the document being reproduced. The invention is used in an apparatus for electrophotographically recording information from a document on a film, wherein the apparatus comprises a transparent copyboard upon which the document is placed, light means for illuminating the document placed on the copyboard, mirror means for directing the light image from the document to the film, and lens means for focusing the light image on the film. The invention is an improvement in the copyboard and consists of a white border extending around the perimeter of the copyboard on the light means side of the copyboard and dark, preferably black, border extending around the inside perimeter of the white border and on the document side of the copyboard. The dark border framing the inner image is on the same plane as the image being reproduced, which eliminates shadows which would occur if the dark border were positioned on the side of the copyboard closest to the light means. The white border is on the side closest to the light means so that it is not affected by the light attenuation which occurs as a result of passing through the glass. This causes the border to image whiter than the whitest background area of a document placed upon the copyboard, which creates sharper field contrast between the white border and the dark border, thus assuring a cleaner and sharper border on the image. Furthermore, by placing the white border on the light means side of the copyboard, the image of the white border is not subjected to specular reflection by being passed through the glass copyboard, and therefore produces a finer image on the film.

DESCRIPTION OF THE PREFERRED EMBODIMENT

Figure 1:
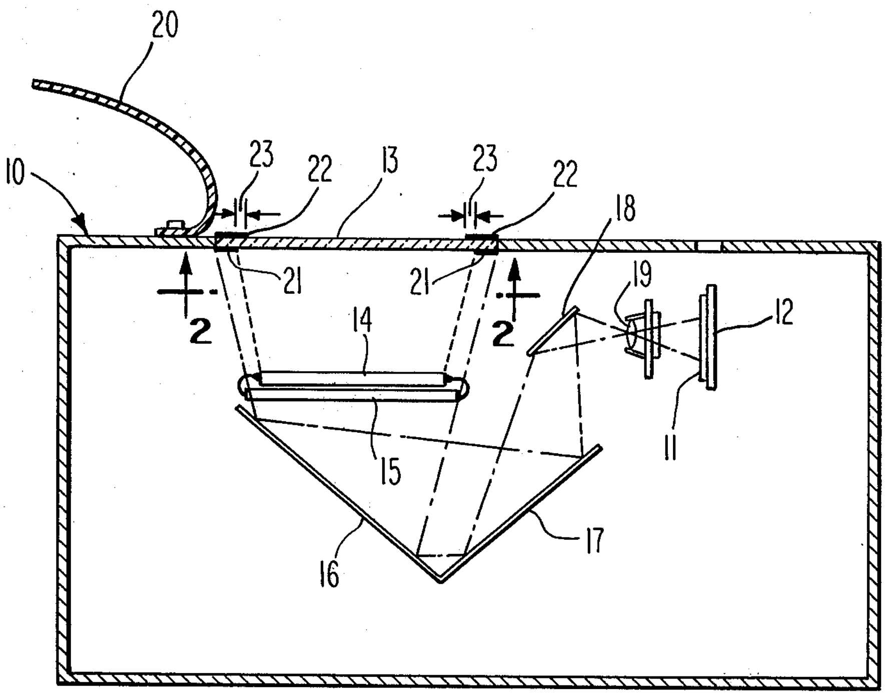
FIG. 1 schematically illustrates in a cross-sectional view a photographic reproduction apparatus in which the invention is preferably employed.
Figure 2:
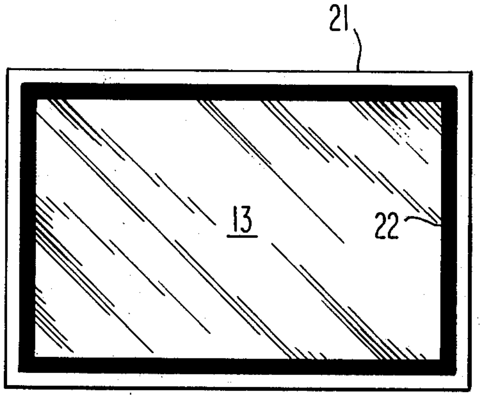
FIG. 2 illustrates a sectional view of the underside of the copyboard illustrated in FIG. 1, taken along lines 2—2.

The electrophotographic reproduction apparatus in which the present invention is preferably employed, illustrated in FIG. 1, includes an enclosure 10 of generally rectangular configuration. The enclosure 10 is designed to protect the operational parts of the apparatus and block out any undesired light. Within the enclosure 10, a microfiche 11 is held on the carrier 12 for recording information from a document placed upon a transparent copyboard 13. Within the enclosure 10 is a lamp 14 and reflector 15 for reflecting light from the document on the copyboard 13 and directing it by mirrors 16, 17, and 18 through lens 19 and onto the desired location on the microfiche 11. A flexible copyboard cover 20, made from an opaque material, is attached to top of enclosure 10 for covering, during imaging, a document placed upon copyboard 13.

Beneath transparent copyboard 13, which is preferably made from glass, is a white border 21 extending around the perimeter of copyboard 13 on the side nearest to lamp 14. On the other side of copyboard 13 (the side upon which the document is placed), a dark border 22 extends around the perimeter of copyboard 13. The dark border 22 extends inwardly beyond the light border 21. Light from lamp 14 casts a shadow from white border 21 upon the undersurface of dark border 22 (illustrated with a broken line). When an image is produced on microfiche 11 from a document placed on copyboard 13, the white border 21 and dark border 22 is photographically reproduced upon the microfiche 11, also. Only the portion of dark border 22 which extends inwardly beyond the shadow of white border 21, that part designated by arrows and the numeral 23, are reproduced as the dark border on microfiche 11.

Figure 3:
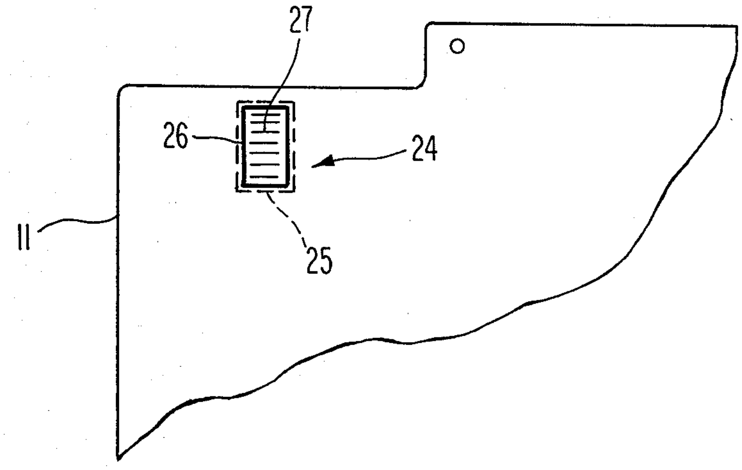
FIG. 3 illustrates a portion of a microfiche imaged in the preferred apparatus of the invention.

Referring to FIG. 3, an imaged frame 24 is illustrated on microfiche 11 with broken line 25 showing the outline of the frame 24, which usually is not visible. A dark border 26 within the frame outline 25 is formed on the frame 24 with a circumscribed white border between dark border 26 and frame outline 25. Document information 27 is illustrated within the enclosure formed by dark border 26.

Figure 4:
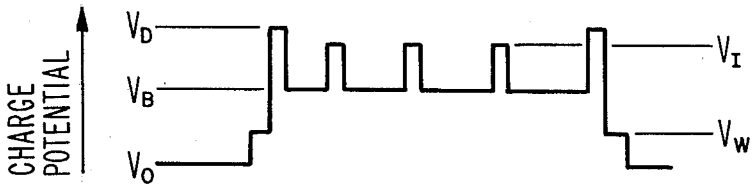
FIG. 4 illustrates a charge potential at various portions of an imaged frame of the microfiche illustrated in FIG. 3.

Referring to FIG. 4, the charge potentials of the various portions of frame 24 resulting from imaging the frame, but before developing, are illustrated. The lowest charge level $V_O$ is the charge level of the surrounding microfiche beyond frame 24, and is generally zero volts. The charge potential in the white border region (that part between frame perimeter 25 and dark border 26) has the lowest charge potential within the frame 24 and is indicated by $V_W$. Immediately adjacent the white border is the dark border 26 which has the highest charge potential within the frame 24 (indicated by $V_D$) because it has been discharged to the least extent by the imaging process. Within the information containing area of the frame 24 are various locations containing data having a relatively undischarged potential and indicated by the $V_I$. And also within the information containing area of frame 24 are the background areas of the document which have been discharged to a greater extent than any portion of the frame 24 with the exception of the white border. This area is designated as $V_B$. It can be readily seen from FIG. 4 that the contrast in charge potential between the white border, $V_W$, and the dark border 26, $V_O$, is substantial and will produce a very sharp dark border region 26 around frame 24, in accordance with well known development principals, thus eliminating undesirable edge toning.

A variety of means can be employed for forming the white border 21 and the dark border 22 on copyboard 13, but by way of example, a commercial black ebony enamel and a white enamel painted upon the copyboard 13 have been employed satisfactorily.

Having described the invention, I claim:

1. In an apparatus for electrophotographically recording information from a document on a film, comprising a transparent copyboard having one side upon which the document is placed, light means on the opposite side of the copyboard from said one side for illuminating the document placed on the copyboard, mirror means for directing the light image reflected from the document to the film, and lens means for focusing the light image on the film, the improvement in the copyboard comprising:

a white border extending around the perimeter of the copyboard on the light means side of the copyboard; and a dark border extending around the inside perimeter of the white border and on the document side of the copyboard.

* * * * *